United States Patent Office 3,285,910
Patented Nov. 15, 1966

3,285,910
DERIVATIVES OF 3,4-DIHYDRO-1,2,4-BENZO-
THIADIAZINE-1,1-DIOXIDE
Rezső König, 13a Battai utca, and Zoltán Földi, 10
Abranyi Emil utca, both of Budapest, Hungary
No Drawing. Filed May 4, 1960, Ser. No. 135,387
3 Claims. (Cl. 260—243)

This invention is concerned with new benzo-dihydro-thiadiazine-dioxide derivatives and methods for their preparation.

We have found that the new benzo-dihydro-thiadiazine derivatives of the general formula

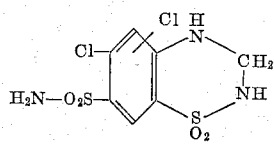

have valuable pharmaceutical properties. They may be used as effective diuretics when administered orally.

Especially the excretion of chloride ions is significant. Besides the product may be used as intermediate for the preparation of pharmaceuticals. The compound according to the invention may be prepared by reacting the compounds of the formula

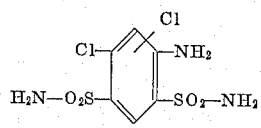

with formaldehyde.

In the starting material of the above indicated formula the position of one of the chloro atoms bound to the nucleus is not yet settled. We assume that the chloro atom takes position 2 of the ring.

The interaction of the two reactants may be effected under greatly varying reaction conditions; it is preferable to carry out the reaction in aqueous medium, e.g. in water at room temperature or at elevated temperatures e.g. at about 80–100° C. The reaction may be brought about in alcoholous solution, e.g. in methanol or ethanol.

Futher details of the process are to be found in the example.

*Example*

3.25 g. of dichloroaniline-disulphonamide, prepared according to the method described below, are mixed with 20 ml. of water and 0.83 ml. of a 40.7% solution of formaldehyde. The mixture is then boiled for two hours under reflux. On cooling a thick crystal mass is formed and, after standing half an hour in ice water, this is filtered and the crystals washed with 5 x 1 ml. of water and dried in vacuo to constant weight. 3.3 g. of dichloro-7 - sulphonamido - 1,2,4-benzo-dihydro-thiadiazine-1,1-dioxide are obtained melting in this state at 287–288° C. with decomposition. For purification, the product is dissolved in 40 ml. of hot acetone and, after addition of 150 ml. of water, it is cooled. The product, which precipitates as uniform needle-like crystals, is separated on a vacuum filter, washed with a few mls. of water, and dried to constant weight. 2.7 g. of the purified product are obtained, melting at 298–299° C. decomposition. After a part of the acetone in the aqueous acetone mother liquor has been eliminated, a further 0.35 g. of the above product are obtained, melting at 299° C. with decomposition.

The starting material of this example was prepared as follows: 84 ml. of m-chloroaniline are added during 20 minutes to 420 ml. of chlorosulphonic acid while stirring and cooling with ice water. The reaction mixture is heated to 120° C. and held for 3.5 hours at this temperature, until no more gas is developed. The weight of the reaction mixture amounts to 801 g. 189 g. of this material is worked up as follows.

On addition of 38.3 ml. of thionylchloride the mixture is warmed up during 1.5 hours to 60° C., while stirring and held for 4.5 hours at this temperature, until there is no further gas envolved. 15 g. of gaseous chlorine are then introduced over 3.5 hours into the reaction mixture. The mixture is then poured on 1.5 kg. of ice. The precipitated dichloroaniline disulphochloride is filtered and washed with ice water until the pH value reaches 3 (1 liter of ice water). The wet product (about 130 g.) is dissolved in 1 liter of cold chloroform, washed with 3 x 100 ml. of ice water, dried over sodium sulphate and evaporated in vacuo to 100 ml. volume. The needle-like crystals are filtered, washed with some chloroform and dried at 40° C. in vacuo. 30.5 g. dichloroaniline disulphochloride are obtained; M.P. 167° C. According to the method of Carius the chloride content amounts to 39.8% (calc. 39.7%). Further quantities may be obtained by evaporation of the mother liquors and washings.

1 g. of dichloroaniline-disulphonic acid chloride (M.P. 167° C.), which was prepared as described above, is added to 50 ml. of 4 N anhydrous alcoholic ammonia. A clear yellow solution is obtained, which soon decolourises while the temperature of the mixture rises to 55–60° C. The mixture is now evaporated in vacuo to dryness, 50 ml. of water are added to the residue, it is thoroughly stirred and after standing for half an hour in ice water the crystals precipitated are separated on a vacuum filter. They are washed with 6 x 1 ml. of water until free of halogen, and dried in vacuo at 50° C. 0.8 g. of colourless crystals are obtained melting in this state at 276° C. For final purification they are dissolved in anhydrous acetone and precipitated after filtration with petroleum spirit, thus giving needle-like crystals of dichlore aniline-4,6-disulphonamide. The melting point is 278° C., with slight decomposition. The chlorine content as determined according to the Carius method amounts to 22.05%, instead of the calculated 22.2%. The following formula is assumed for this product:

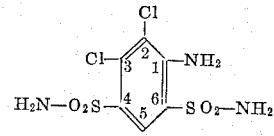

The product of this example (dichloro-7-sulphonamido - 3,4 - dihydro - 1,2,4-benzothiadiazine-1,1-dioxide) exhibits an excellent diuretic action, which is illustrated by the following experiments:

Six series, consisting of 3 white rats each, were used (total weight of the rats being about 600 gs.). The 5-hour urinary output was measured. In the first series the animals did not receive any medicament at all. This series was serving as a control. The chloride excretion of these animals was found to be 31.74 mg./kg. body-weight.

The second series received 0.2 mg./kg. body weight of the product prepared according to the example, perorally. The total amount of chloride ions excreted was found to be 48.84 mg./kg. body-weight.

The third series received 0.5 mg./kg. body weight of the product prepared according to the example, perorally. The total amount of chloride ions excreted was found to be 59.83 mg./kg. body-weight.

The fourth series received a dose of 1 mg./kg. body weight of the product prepared according to the example, perorally. The total amount of the chloride ions excreted by these animals was found to be 68.05 mg./kg. body-weight.

In a fifth series the animals received perorally 2 mg./kg. body-weight of the product. The total amount of excreted chloride ions was found to be 76.38 mg./kg. body-weight.

Doses of 4 mg. per kg. body-weight were administered perorally to the sixth series of animals, resulting in 84.51 mg./kg. body-weight chloride ion excretion.

What we claim is:

1. Compounds of the formula

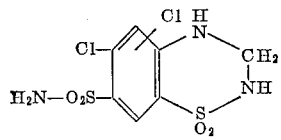

2. Process for the preparation of the new compounds of the formula

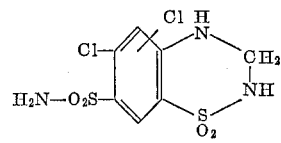

which comprises contacting the compound

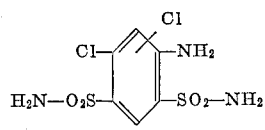

with formaldehyde for a time and at a temperature sufficient to form said compound.

3. A process which comprises reacting dichloro-aniline-disulphonamide in aqueous solution with formaldehyde, heating the reaction mixture at 80–100° C. and isolating after cooling dichloro-7-sulphonamido-1,2,4-benzo-dihydro-thiadiazine-1,1-dioxide in crystalline form from the reaction mixture.

References Cited by the Examiner

FOREIGN PATENTS 826,921   1/1960   Great Britain.

OTHER REFERENCES

Abstract of Papers 135th American Chemical Society Meeting, pages 26N, 27N and 28N (1959).

Close et al.: Jour. Amer. Chem. Soc., vol. 82, pages 1132–1138 (March 5, 1960).

Experientia, vol. 14, page 463 (1958).

NICHOLAS S. RIZZO, *Primary Examiner.*

IRVING MARCUS, *Examiner.*